United States Patent
Hare et al.

(10) Patent No.: US 8,082,555 B2
(45) Date of Patent: Dec. 20, 2011

(54) ROUTING CALLS VIA REFLECTIVE INTERFACES AND A PROXY

(75) Inventors: Charles Aaron Hare, Redmond, WA (US); John A. Shepard, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1271 days.

(21) Appl. No.: 11/358,335

(22) Filed: Feb. 21, 2006

(65) Prior Publication Data
US 2007/0209043 A1   Sep. 6, 2007

(51) Int. Cl.
  *G06F 13/00*   (2006.01)
  *G06F 9/44*   (2006.01)
(52) U.S. Cl. .................. 719/328; 717/122; 717/170
(58) Field of Classification Search .................. None
  See application file for complete search history.

(56) References Cited

U.S. PATENT DOCUMENTS

| | | | | |
|---|---|---|---|---|
| 6,272,557 B1 * | 8/2001 | Lim et al. | ...... | 719/315 |
| 6,493,768 B1 * | 12/2002 | Boutcher | ...... | 719/330 |
| 7,246,358 B2 * | 7/2007 | Chinnici et al. | ...... | 719/315 |
| 7,373,632 B1 * | 5/2008 | Kawaguchi et al. | ...... | 717/100 |
| 7,533,388 B1 * | 5/2009 | Cavanaugh | ...... | 719/330 |
| 7,543,019 B1 * | 6/2009 | Cormier | ...... | 709/203 |
| 2005/0050548 A1 * | 3/2005 | Sheinis et al. | ...... | 719/311 |
| 2005/0216885 A1 * | 9/2005 | Ireland | ...... | 717/108 |

* cited by examiner

*Primary Examiner* — S. Sough
*Assistant Examiner* — Phuong Hoang
(74) *Attorney, Agent, or Firm* — Woodcock Washburn LLP

(57) ABSTRACT

A dynamic proxy object is disclosed that is capable of intercepting calls from a calling object to a target object. The dynamic proxy can imitate the target object so that even though the calling object may be of a different version or type from the target object, it can still communicate with the target object. Specifically, the dynamic proxy can intercept early bound invocation by the calling object, obtain metadata from these invocations, and pass it to an adapter via a set of reflective interfaces. The adapter can also obtain metadata from the target object via late bound invocations, and then compare this metadata to the metadata provided by the dynamic proxy in order to make a determination whether or not the calling object and the target object should be communicating. If so, communication can occur between the calling and target objects in spite of differing versioning or object types.

20 Claims, 6 Drawing Sheets

ROUTING CALLS VIA REFLECTIVE INTERFACES AND A PROXY

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, Microsoft Corp.

FIELD OF TECHNOLOGY

The present subject matter relates to the field of computing, and more particularly, to runtime environments.

BACKGROUND

In general, a managed runtime environment may expect that objects are strongly-typed. For instance, a method which expects to receive an instance of "Class A" cannot operate on an instance of "Class B"—that is, unless the instance of "Class B" can be converted to an instance of "Class A" beforehand. Such a runtime environment can take type identity seriously: even two types that differ only by version number may be considered unique. This distinction is necessary because methods designed to operate on a type of version 1 may or may not work with an instance of version 2.

A problem may occur when runtime environment's strict type-safety rules block a call from occurring when the two objects are not significantly different. For example, if the only thing that changed between two versions was a version number, or if the changes between versions were strictly additive, then there is no reason that a method that expects a version 1 type can't operate on an equivalent type of version 2. To enable these scenarios, it would be advantageous to weaken the type-safety of a runtime environment in a controlled manner so that a caller can perform the same actions on either version of the type.

This may be accomplished by using two mechanisms in conjunction. The first mechanism may create an adapter that abstracts an object into a set of reflective interfaces (which in general terms may be referred to as "contracts"). These interfaces can be used to describe the object and to invoke its members without knowing the type of the object itself. This may be sufficient to address the problem of versioning: it allows the same code to work regardless of the version of the target object. However, it requires performing a complicated set of method invocations on the interfaces to perform even the most simple method call. Thus, one of the many problems addressed by the present subject matter is how to make a series of calls on reflective interfaces appear in code as a simple method calls, allowing objects of different versions and types to communicate with one another.

SUMMARY

Various mechanisms and techniques are provided that allow objects of different versions and types to communicate with one another. In one exemplary but not limiting aspect of the presently disclosed subject matter, a dynamic proxy is provided that may be created at runtime in order to intercept early bound invocations (or calls) from a calling object to a target object. The dynamic proxy object can impersonate the target object in order to handle calls from the calling object that may be of a different version or type then the target object. The dynamic proxy can process these calls and obtain metadata associated with them. This metadata can be passed to an adapter via immutable reflective interfaces or "contracts." Once this information is passed to the adapter, the adapter can obtain similar metadata information from the target object using late bound invocations, as exemplified by some reflection functionalities of a managed runtime environment. The adapter can then compare these two sets of metadata in order to make a determination whether the original invocation from the calling object onto the target object is a match (or not). If it is, the adapter together with the dynamic proxy object can allow the calling object and the target object to communicate in spite of the fact that these two object may be of different versions or types.

It should be noted, however, that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Overview

In the first part of this Detailed Description, specifically, FIG. 1-4, various aspects of the present disclosure are considered. For example, a dynamic proxy is discussed that is configured to intercept invocation from a calling (or source) object onto a target object. This dynamic proxy can be created at runtime to process early bound invocations, obtain metadata from them and then pass this information to an adapter via reflective interfaces. The adapter, in turn, can obtain metadata information from the target object and compare this metadata to the metadata obtained from the dynamic proxy, in order to allow (or not allow) communications between the calling object and the target object. This setup, can allow the target object to change in version or in type while still allowing for communication between itself and the calling object in a typical managed runtime environment.

Aspects of Routing Calls Via Reflective Interfaces and a Proxy

Figure 1:
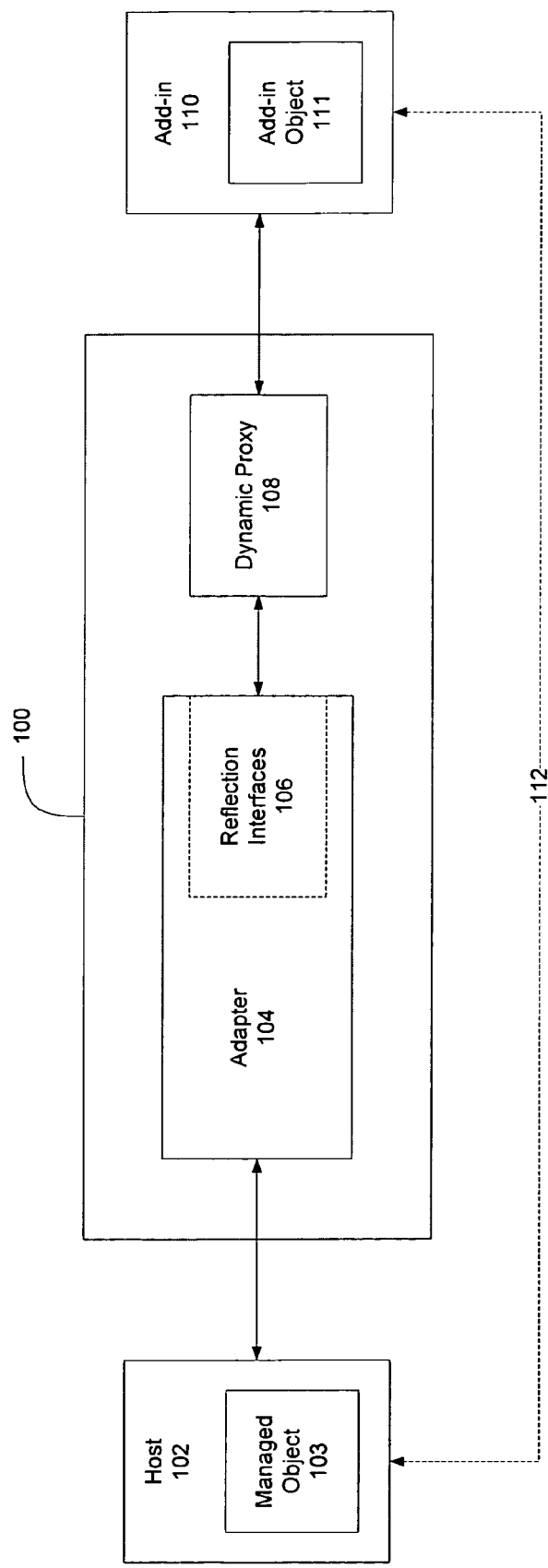
FIG. 1 presents a general overview of a system for routing calls to objects of differing versions and/or types via reflective interfaces and a dynamic proxy.

In one aspect of the presently disclosed subject matter, FIG. 1 presents a general overview of a system 100 for routing calls to objects of differing versions and/or types via reflective interfaces 106 and a dynamic proxy 108. In a typical exemplary, but not limiting scenario, a host 102 may want to communicate with an add-in 110. The host 102 may be an application or some kind of software program, and the add-in 110 may be another application or software program that is communicatively coupled to the host 102. One prosaic example of such a host 102 and add-in 110 could be a word processing program and a spell-checking program, respectively, where the spell-checking program may be of a different version or even type than the word processing program is expecting.

The host 102 may have some object, for example, a managed object 103 that may want to communicate with the add-in 110, which, in more specific terms, may also have some object 111. Thus, the managed object 103 and the add-in object 111 may want to communicate either by the former calling the latter, or vice versa. The managed object 103 and the add-in object 111 may use objects of the same type and same versions, same types and different versions, or of different types altogether. The system 100 illustrated in FIG. 1, allows such objects 103 and 111 to communicate in spite of any version or type differences between them. It accomplishes this task by using an adapter 104 and a dynamic proxy 108.

In one exemplary scenario, the add-in object 111 may want to call the managed object 103 (the opposite scenario could also happen, where the managed object 103 calls the add-in object 111, as those of skill in the art will readily appreciate). If add-in object 111 does call the managed object 103, the add-in object 111 will actually call the dynamic proxy 108 instead of the managed object 103. The dynamic proxy 108 will receive the call from the add-in object 111 (or more generally, any calling object to the managed object 103) in lieu of the managed object 103. Put another way, the dynamic proxy 108 can intercept calls to the managed object 103 by any calling object, and thus the dynamic proxy 108 can impersonate or represent the managed object 103, when in fact is it a proxy for such an called-upon object.

Once the dynamic proxy 108 intercepts such calls from the add-in object 111, it can process such calls, which may include all kinds of information, whether code and/or data. For instance, the calls may include the names of methods and properties, parameters, whether something is a method, a property, or an event, names of parameters, attributes, types of parameters, return types, etc. In short, all kinds of relevant data to a call (and even ancillary data sometimes). The processing of calls may include all kinds of information manipulation, including transforming of such information into a different formats, states, etc. Upon processing, such calls can be presented to reflection interfaces 106 exposed by the adapter 104.

These reflective interfaces 106 can be thought of as "contracts" that can be used to describe objects or modules, their members, and so on. Viewed another way, the reflective interfaces 106 can be restrictive and immutable interfaces that help form a closed system. They 106 can describe real objects, such as types of classes, or, put another way, they can be thought of as describing ways to interrogate types. In any event, these reflection interfaces 106 can provide channels of communication for the dynamic proxy 108, so that the dynamic proxy 108 can pass on any useful and relevant information to the adapter 104 (or vice versa). Moreover, reflection interfaces 106 are implemented by adapters, such as the illustrated adapter 104.

Once the adapter 104 obtains information from the dynamic proxy 108, it can process this information to prepare it for comparison to information obtained from the host 102. Thus, the adapter 104 can obtain information about host 102 types, type derivation, the methods available on any relevant objects, what their parameter are, and so on. Once the adapter 104 receives the information from both sides—i.e. from the host 102 side and the add-in side 110—such information can be matched up. For instance, if the add-in 110 calls on a particular class of the managed object 103, say, class A1, the dynamic proxy 108 can intercept this call, process it, and forward it to the adapter 104. If it happens to be the case that the managed object 103 has been changed so that it has a different version of class A, say, class A2, it can still respond to the call from the add-in 110 because it is the dynamic proxy 108 that communicates with the add-in 110 in lieu of the managed object 103. The dynamic proxy 108 can take in this class A2, forward it to the adapter 104, and an appropriate match can be made to the intended class call, namely, class A1. As those of skill in the art will fully appreciate, such disparity in class calls do not only have to be limited to different class versions, but can extend to different class types.

Figure 2:
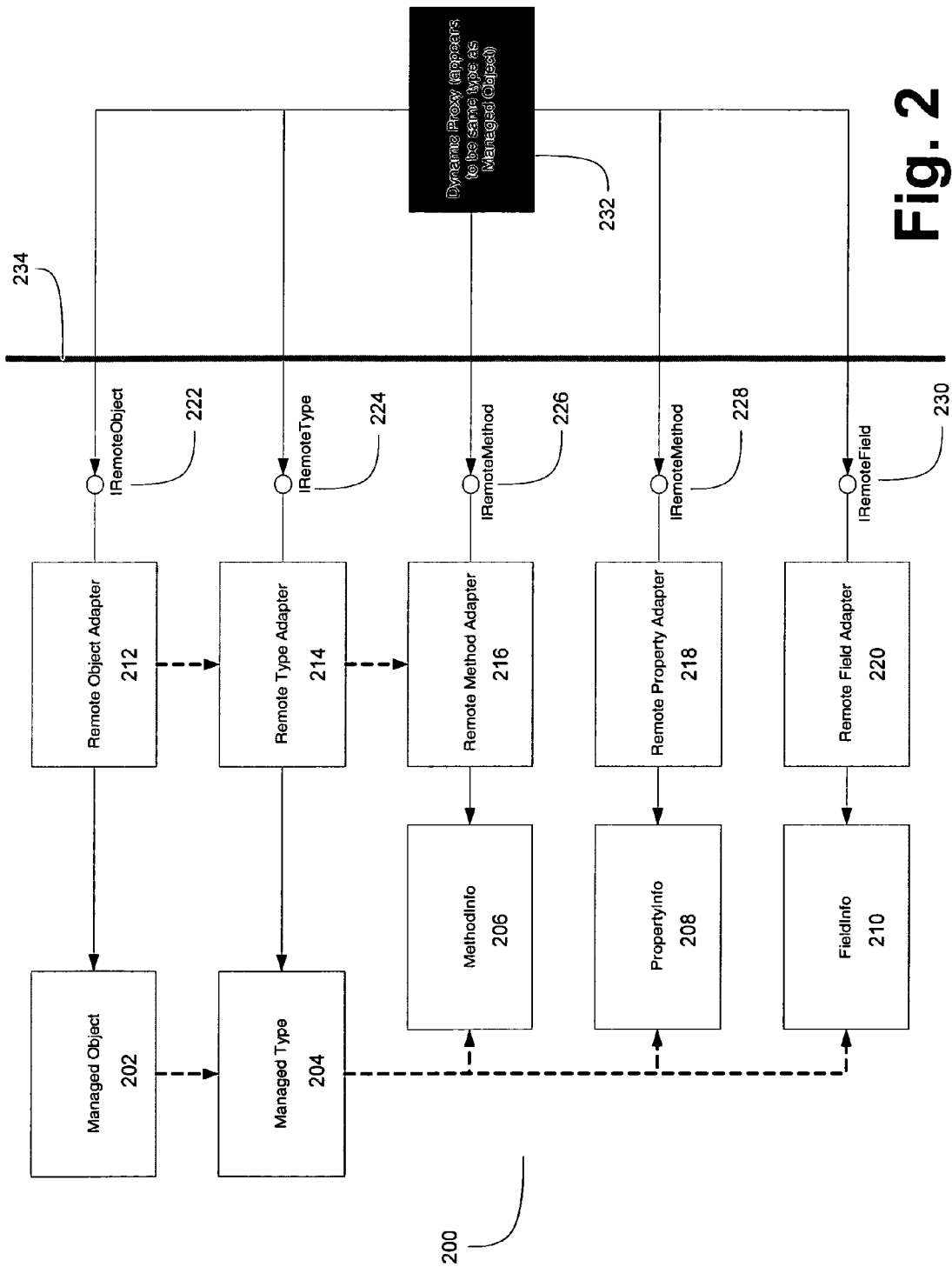
FIG. 2 illustrates an object and adapter oriented point of view of an exemplary system for routing calls via reflective interfaces and a dynamic proxy.

Next, FIG. 2 illustrates an object and adapter oriented point of view of an exemplary system 200 for routing calls via reflective interfaces and a dynamic proxy. In FIG. 2, a dynamic proxy 232 appears to a calling object (not illustrated), such as the add-in 110 of FIG. 1, to be the same type as a managed object 202. In actuality, the dynamic proxy 232 is a proxy object for the managed object 202, and it is located on the opposite side of a remoting boundary 234 than the managed object 202. In an alternative aspect, the dynamic proxy 232 and the managed object 202 can reside on the same side of a remoting boundary, i.e., reside in the same process.

Once the dynamic proxy 232 receives input from a calling object, upon processing the input, it can forward it to the remote object adapter 212 via the IRemoteObject reflective interface 222. This remote object adapter 212 can in turn interrogate the managed object 202 for any relevant information to the input initially given to the dynamic proxy 232. Once this interrogation is made, using, for instance NET reflection functionalities, a managed type 204 can be created by the managed object 202 which will have it's own corresponding remote type adapter 214 (with a corresponding reflective interface IRemoteType 224—which is accessible by the dynamic proxy 232).

It should be noted that this newly created managed type 204 can in turn create other useful information, such as MethodInfo 206 that might have method information for the particular type. Naturally, MethodInfo 206 can have its own remote method adapter 216, with an IRemoteMethod 226 reflective interface. Other useful and relevant information can be created by the managed type 204, such as PropertyInfo 208 and Field Info 210 with their respective reflective interfaces, namely, remote property adapter 218 and remote field adapter 220. It should be noted that the dashed lines in FIG. 2 represent the act of creation and sold lines refer to the calling. Thus, the managed object 202 creates the managed type 204, and the remote object adapter 212 calls the managed object 202.

With all these adapters 212, 214, 216, 218, and 220 in place, the dynamic proxy 232 can communicate with each of them via the reflective interfaces 222, 224, 226, 228, and 230, in order to impersonate or represent the managed object 202 to a calling object. The calling object may not even be aware that it is not communicating with the real managed object 202, but instead that it is actually invoking a substitute proxy object 232, that happens to be dynamically created. Of course, the illustrated functionalities in FIG. 2 are merely exemplary and not limiting. Thus, other information could be created by the managed type 204, for instance, parameter information, attribute information, return types, etc.—aside from merely method information 206, property information 208, or field information 210.

Figure 3:
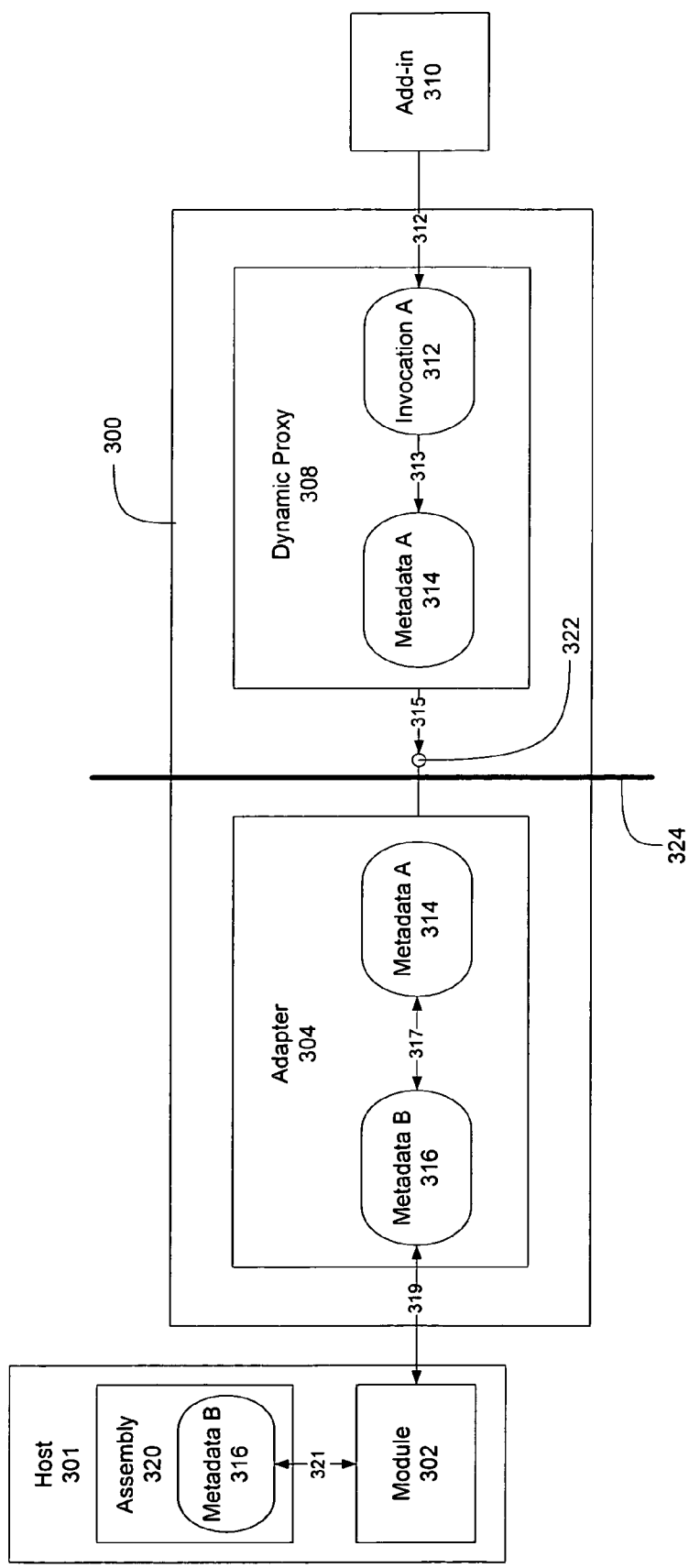
FIG. 3 illustrates how metadata can be used to help route calls via adapter reflective interfaces and a dynamic proxy.

In one aspect of the presently disclosed subject matter, FIG. 3 illustrates how metadata 314, 316 can be used to help route calls via adapter reflective interfaces 322 and a dynamic proxy 308. In FIG. 3, an add-in 310 may attempt to make an invocation 312 on some module 302 (or type thereof) within a host 301. As per the discussion above, the dynamic proxy 308 can intercept this invocation 312. Once the dynamic proxy 308 has intercepted the invocation 312, it can process the invocation 312 by transforming 313 it, namely, by extracting or obtaining metadata 314 related to the invocation 312. The metadata 314, as already suggested above, may provide information about the invocation 312, relating method information, parameter information, field information, and so on.

Once the invocation metadata 314 is obtained, this metadata 314 can be forwarded 315 to the adapter 304 via reflective interfaces 322. Once available to the adapter 304, this metadata 314 can be compared to or matched up 317 against metadata 316 obtained 319 from the target module 302 (it should be noted that this comparison of metadata, although in this example performed by the adapter 304, could just as easily be performed by the dynamic proxy 308—this much is an implementation choice). In one aspect of the presently disclosed subject matter, the host 301 may provide for an assembly 320, where at compile time metadata 316 related 321 to the module 302 is stored, and is accessible 319 at runtime to the adapter 304. Once a determination is made what module metadata 316 corresponds to add-in's invocation metadata 314, which may be a function of matching up canonical (unique) names stored in the module 302 and add-in 310—which, in short, have a correspondence to the types of objects in the module 302 and add-in 310—the appropriate type of the module 302 can be invoked on behalf of the add-in 310.

As those skilled in the art will readily appreciate, the process described above can be reversed, where the host 301 can make invocations upon the add-in 310. In such a case, the process described above would create a dynamic proxy for the module 302 to communicate with and a corresponding adapter to match up metadata, in the manner described above, where the metadata would again be obtained from both sides of the remoting boundary 324, namely, the module 302 and the add-in 310. In this case, the dynamic proxy would be on the left side of the remoting boundary 324 and the adapter would be on the right side, exactly opposite as they are depicted in FIG. 3.

In any case, one important advantage of using the dynamic proxy model 300 described above is that by impersonating the "real" module 302 and fielding calls made to the module 302, the dynamic proxy 308 allows the module 302 to change either in version or in type, yet allowing it to accept calls from the add-in 310. Put in other words, in general terms, the dynamic proxy 308 can be thought of as a class created at runtime, for impersonating a type, for the purpose of capturing early bound invocations and passing metadata from such calls through a set of version resilient contracts, to an adapter which uses the metadata to make late bound invocations on the target object, allowing the target object's type to change at runtime.

Figure 4A:
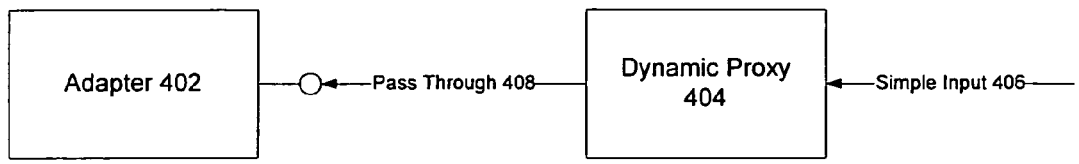
FIG. 4A illustrates how simple input provided to the dynamic proxy is simply passed through (or routed) to an adapter via reflective interfaces.

Next, FIGS. 4A-4D illustrate what happens when various types of inputs and outputs are passed through the adapter-cum-dynamic proxy setup. Specifically, FIG. 4A illustrates what happens when "simple input" 406 in provided to the dynamic proxy 404. The notion of a "simple input" 406 entails the use of scalar values and the like. When "simple input" 406 is intercepted by the dynamic proxy 404, this input is simply passed through 408 to the adapter 402 without much more being done.

Figure 4B:
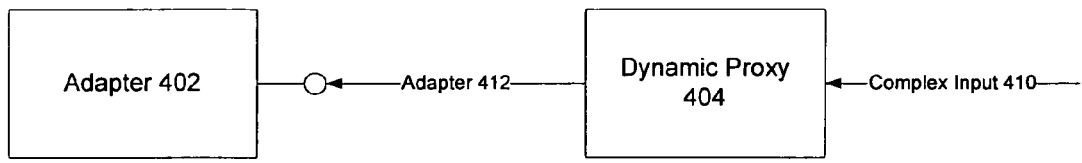
FIG. 4B illustrates how complex input provided to the dynamic proxy is encapsulated in an adapter and passed through to an adapter via reflective interfaces.

Conversely, in FIG. 4B, when "complex input" 410 is intercepted by the dynamic proxy 404, such input, which may consist of complex class types, may be conveyed to the adapter 402 as an adapter 412. Thus, in another aspect of the presently disclosed subject matter, the dynamic proxy can create adapters and pass them on to other adapters. It should also be noted that using reflection interfaces, adapters can receive other adapters. Thus, the receiving adapter 402 may receive the complex input 410 as an adapter 412.

Figure 4C:
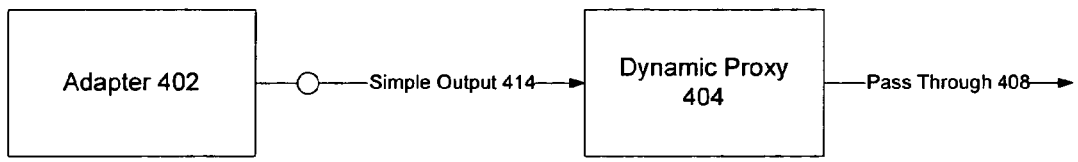
FIG. 4C illustrates how simple output originating from an adapter is simply passed through to a dynamic proxy via reflective interfaces.
Figure 4D:
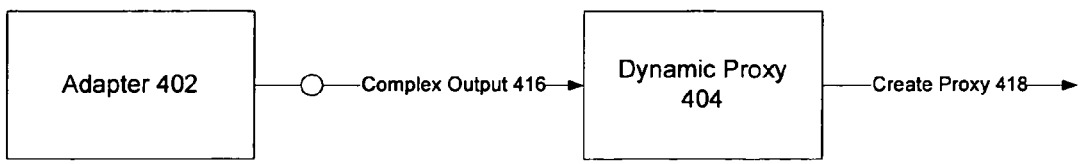
FIG. 4D illustrates how complex output originating from an adapter is passed through to a dynamic proxy via reflective interfaces and then provided in another dynamic proxy to the original calling object.

Similarly to FIGS. 4A and 4B, FIGS. 4C and 4D illustrate the same concepts but with respect to output—instead of input. Hence, FIG. 4C illustrates that when "simple output" 414, such as scalar values, is provided to the dynamic proxy 404, the "simple output" 414 passes through to a module or object, such as an add-in. And, FIG. 4D illustrates the notion that "complex outputs" 416 provided to the dynamic proxy 404 may require the creation of another proxy 418 for the consuming module or object.

Aspects of an Exemplary Implementation

So far, in various aspects of the presently disclosed subject matter, it has been shown that a dynamic proxy can be used to impersonate an object of the specified type. The consumer of the type can simply invoke a member of the type using the usual syntax. The dynamic proxy may intercept the invocation, and redirect it to the appropriate calls on the reflective interfaces. There may no longer be any need to change the programming model of the object or to call on interfaces directly. Dynamic proxy will assume the correct type, and will redirect calls so that the interface implementation can take appropriate action. Moreover, the dynamic proxy and the adapter can be used in (subsist in) a managed runtime environment, such as Microsoft's .NET runtime environment. This is merely an exemplary and non-limiting runtime environment, and those of skill in the art will appreciate the fact that other runtime environments can be used as well.

Figure 5:
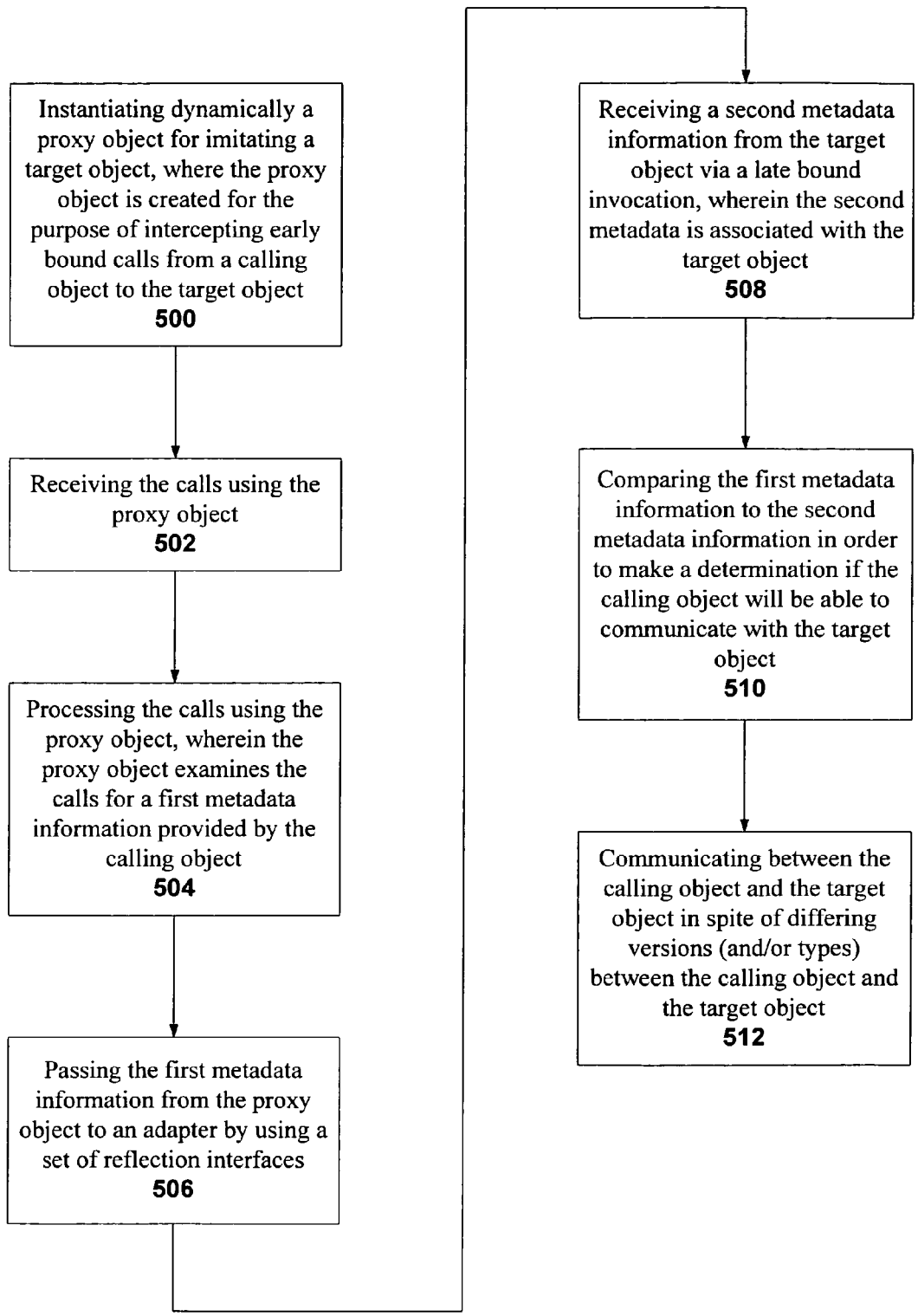
FIG. 5 illustrates in block diagram form one exemplary implementation of the aspects considered in FIGS. 1-4.

In the interest of further making concrete the discussion considered so far, some exemplary implementations are discussed. For example, in one aspect of the presently disclosed subject matter, a method is disclosed that allows for the communication between objects of differing versions and/or differing object types in a computing system running a managed runtime environment. For example, FIG. 5 illustrates in block diagram for some exemplary action that could be taken by the presently disclosed subject matter. At block 500, a proxy object is created dynamically (at runtime) by instantiating the proxy object. Such a proxy object can be used for imitating a target object, where the proxy object is created for the purpose of intercepting early bound calls from a calling object to the target object.

Next, at block 502, the aforementioned calls can be received using the proxy object. Then, at block 504, once the calls are received, they can be processed. Processing the calls may entail examining them for a first metadata information associated with the calling object. Put another way, such early bound intercepted calls (or invocations) can be transformed in such a way that metadata is extracted from them—the metadata contents consisting of the subject matter discussed above with reference to FIG. 3.

At block 506, the first metadata information is passed from the proxy object to an adapter by using a set of reflection interfaces. As mentioned already, these reflection interfaces can be immutable contracts that don't change between different versions or types of objects attempting to communicate. In short, they can receive the first metadata from the dynamic proxy in order to compare it to another set of metadata from the target object.

This other set of metadata or second metadata can be received from the target object via reflection mechanisms via late bound invocation by the adapter on the target object, as shown at block 508. The second metadata can describe the functionalities of the target object. Once this second metadata is obtained by the adapter, the adapter can compare it to the first metadata it received from the proxy object.

Thus, at block 510, the adapter compares the first metadata information to the second metadata information in order to make a determination if the calling object will be able to communicate with the target object. The calling object and the target object can communicate in spite of being of differing versions or object types if their metadata matches. Such matching can be accomplished by matching up canonical names of methods, properties, and the like. If a match occurs, at block 512, the calling object and the target object are allowed to communicate. This mechanism, described in block 500 to 512 also allows the target object to change, which is something normally not allowed in a managed runtime environment, since a change in version or object types typically destroys any potential of communication between a calling object and a changed target object—or vice versa.

Figure 6:
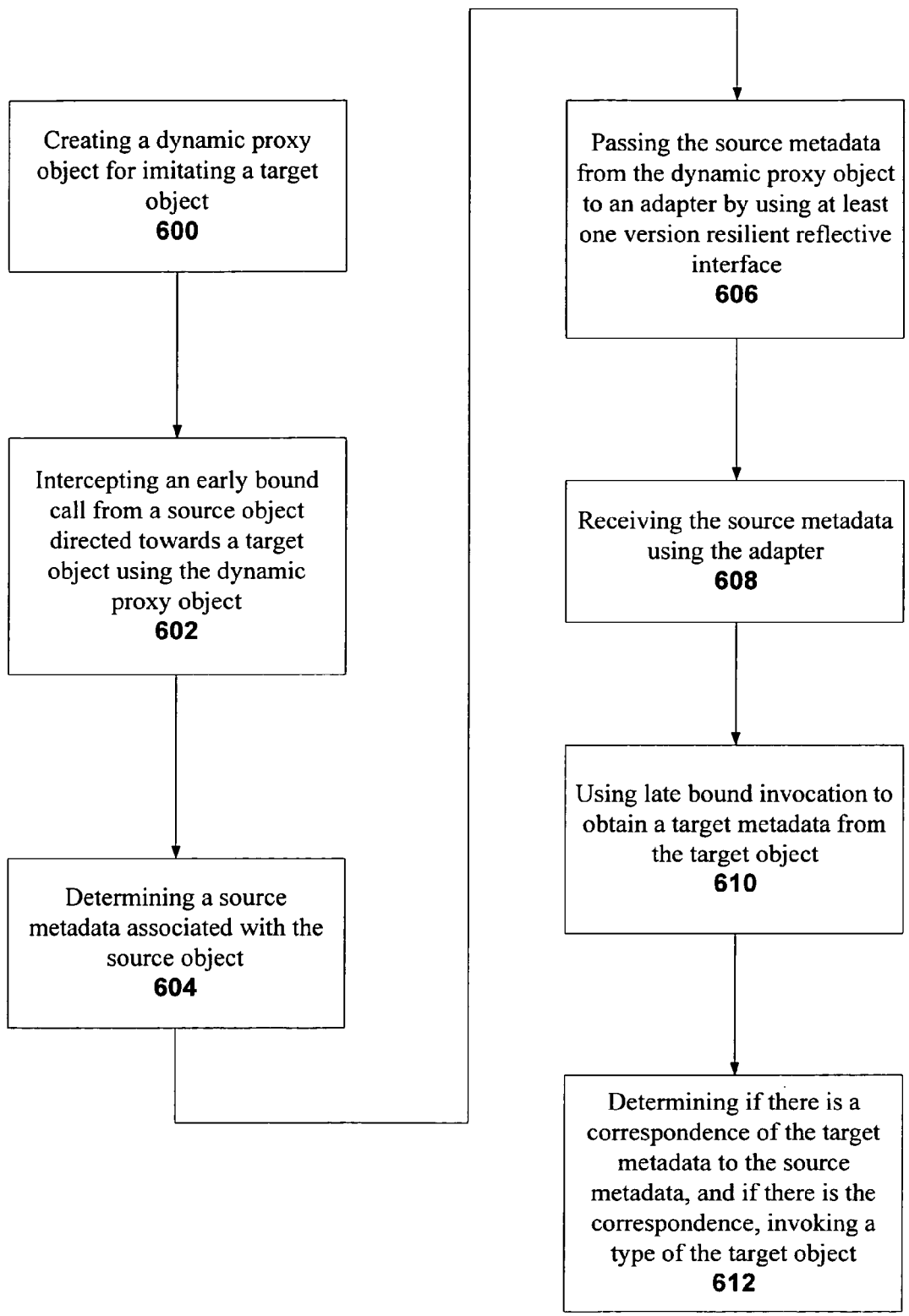
FIG. 6 illustrates in block diagram form yet another exemplary implementation of the aspects considered in FIGS. 1-4.

Next, FIG. 6 illustrates an alternative implementation of the subject matter discussed so far. Thus, at block 600 a dynamic proxy object is first created or instantiated at runtime so that it can imitate a target object, in case the source object is of a different version or type from the target object—this insures that if this is the case, a runtime environment hosting these objects will not break down. Thus, at block 602, an early bound call is intercepted by the proxy object.

Similarly to the FIG. 5 discussion, a source metadata is determined at block 604, where this metadata can include method information, property information, field information, etc. Then at block 606, the source metadata is forwarded from the dynamic proxy object to an adapter by using at least one version resilient reflective interface. At shown at FIG. 1, this interface can be implemented by the adapter, thus, in effect, as block 608 illustrates, the source metadata is received using the adapter.

At block 610, using late bound invocation, the adapter can obtain a target metadata from the target object. Various reflection functionalities can be used, where such functionalities can obtain method, field, property and other kinds of information. Finally, at block 612, a determination can be made if there is a correspondence of the target metadata to the source metadata, and if there is the correspondence, and invocation can be made on a type of the target object, so that the source object can communicate with the target object across a remoting boundary. The remoting boundary, in turn, can be though of as a separation of one process from another process, where the source object resides in the former and the target object resides in the latter. Interestingly, all this can be accomplished while the dynamic proxy and the adapter resides on different physical machines.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, techniques were discussed for routing calls using a dynamic proxy and an adapter with reflective interfaces. However, other equivalent mechanisms to these described aspects are also contemplated by the teachings herein. Therefore, the present disclosure should not be limited to any single aspect, but rather construed in breadth and scope in accordance with the appended claims.

What is claimed is:

1. A system comprising:
   at least one processor;
   a dynamic proxy, created when a call is made on a computing system, that represents a target object, the dynamic proxy being configured to impersonate the target object to intercept an invocation from a calling object, and the dynamic proxy being further configured to extract calling object metadata from the intercepted invocation and redirect the calling object metadata to corresponding calls on a set of reflective interfaces;
   the set of reflective interfaces being configured to receive the calling object metadata from the dynamic proxy and forward the calling object metadata to an adapter; and
   the adapter for matching the calling object metadata to target object metadata on the computing system, the adapter being configured to receive the calling object metadata from the dynamic proxy, the calling object metadata being received as an early bound invocation and being passed from the dynamic proxy to the adapter, and the adapter being configured to receive the target object metadata from the target object as a late bound invocation, allowing the target object to change in at least one of version and type, at runtime resulting in the target object and the calling object to version or type independently of each other.

2. The system according to claim 1, the target object being a different version from the calling object.

3. The system according to claim 1, the target object being a different type from the calling object.

4. The system according to claim 1, the dynamic proxy and the adapter being located on different physical machines.

5. The system according to claim 1, the adapter being configured to match the calling object metadata to the target object metadata by using canonical names assigned to at least one of the calling object metadata and the target object metadata.

6. The system according to claim 1, the dynamic proxy being configured to match the calling object metadata to the target object metadata by using canonical names assigned to at least one of the calling object metadata and the target object metadata.

7. The system according to claim 1, the adapter and the dynamic proxy subsisting in a managed runtime environment.

8. The system according to claim 1, the target object being part of a host application and the calling object is part of an add-in application.

9. The system according to claim 1, the target object being part of an add-in application and the calling object being part of a host application.

10. A method comprising:
  instantiating dynamically a dynamic proxy for imitating a target object, the dynamic proxy being created for the purpose of intercepting an early bound call from a calling object to the target object;
  receiving the call using the dynamic proxy;
  processing the call using the dynamic proxy, the dynamic proxy examining the call to extract calling object metadata from the intercepted call and redirecting the calling object metadata to corresponding calls on a set of reflective interfaces, the set of reflective interfaces being configured to receive the calling object metadata from the dynamic proxy and forward the calling object metadata;
  receiving target object metadata via a late bound invocation using an adapter, the target object metadata being associated with the target object; and
  comparing the calling object metadata to the target object metadata to make a determination if the calling object will be able to communicate with the target object.

11. The method according to claim 10, further comprising communicating between the calling object and the target object in spite of differing versions between the calling object and the target object.

12. The method according to claim 10, further comprising communicating between the calling object and the target object in spite of the calling object and the target object differing in object types.

13. The method according to claim 10, the comparing of the calling object metadata to the target object metadata being based on comparing canonical names in tables associated with the calling object metadata and the target object metadata.

14. The method according to claim 10, the comparing of the calling object metadata to the target object metadata being performed in the dynamic proxy.

15. The method according to claim 10, the comparing of the calling object metadata to the target object metadata being performed in the target object.

16. A system comprising:
  a processor; and
  a memory having stored thereon instructions for:
    instantiating dynamically a dynamic proxy for imitating a target object, the dynamic proxy being created for the purpose of intercepting an early bound call from a calling object to the target object;
    receiving the call using the dynamic proxy;
    processing the call using the dynamic proxy, the dynamic proxy examining the call to extract calling object metadata from the intercepted call and redirects the calling object metadata to corresponding calls on a set of reflective interfaces, the set of reflective interfaces being configured to receive the calling object metadata from the dynamic proxy and forward the calling object metadata;
    receiving target object metadata via a late bound invocation using an adapter, the target object metadata being associated with the target object; and
    comparing the calling object metadata to the target object to make a determination if the calling object will be able to communicate with the target object.

17. The system according to claim 16, further comprising communicating between the calling object and the target object in spite of differing versions between the calling object and the target object.

18. The system according to claim 16, further comprising communicating between the calling object and the target object in spite of the calling object and the target object differing in object types.

19. The system according to claim 16, the comparing of the calling object metadata to the target object metadata being based on comparing canonical names in tables associated with the calling object metadata and the target object metadata.

20. The system according to claim 16, the comparing of the calling object metadata to the target object metadata being performed in the dynamic proxy.

\* \* \* \* \*